United States Patent [19]
Janzen

[11] Patent Number: 5,993,126
[45] Date of Patent: Nov. 30, 1999

[54] ARTICULATED BUNK FOR LOGGING TRUCKS

[76] Inventor: William W. Janzen, P.O. Box 234, Lacrete, Alberta, Canada, T0H 2H0

[21] Appl. No.: 08/694,729

[22] Filed: Aug. 9, 1996

[51] Int. Cl.$^6$ ........................................... B60P 7/12
[52] U.S. Cl. ........................ 410/37; 410/1; 410/32; 410/36; 280/404; 280/145
[58] Field of Search .................... 410/36, 37, 32, 410/34, 1; 296/43; 280/404, 145, 81.6; 105/380; 384/421

[56] References Cited

U.S. PATENT DOCUMENTS

| | | | |
|---|---|---|---|
| 1,799,628 | 4/1931 | Knowles | 410/37 |
| 1,995,695 | 3/1935 | Walker . | |
| 2,559,007 | 7/1951 | Cliffe . | |
| 2,661,235 | 12/1953 | Isachsen | 280/145 X |
| 2,719,729 | 10/1955 | Henrikson . | |
| 2,793,049 | 5/1957 | Shotwell . | |
| 3,011,798 | 12/1961 | Gates . | |
| 3,123,380 | 3/1964 | Grim et al. . | |
| 3,350,116 | 10/1967 | Skirvin et al. . | |
| 3,356,387 | 12/1967 | Skirvin et al. . | |
| 3,370,866 | 2/1968 | Mitchell et al. . | |
| 3,401,955 | 9/1968 | Alton . | |
| 3,472,527 | 10/1969 | Keinonen . | |
| 3,637,235 | 1/1972 | Karlin et al. | 410/37 |
| 3,863,952 | 2/1975 | Hodgson . | |
| 4,188,042 | 2/1980 | Pederson . | |
| 5,127,663 | 7/1992 | Whitehead . | |

*Primary Examiner*—Stephen T. Gordon
*Attorney, Agent, or Firm*—Emery Jamieson

[57] ABSTRACT

A log bunk assembly for use on logging truck-trailer units. The bunk comprises a generally horizontal bunk beam having a recess, hub-and-saucer assembly for allowing the bunk beam and trailer/log load to pivot in the horizontal plane, an upper trunnion saddle contained within the bunk beam recess, a lower trunnion saddle, and a trunnion tube attached to a pedestal mounted on the hub-and-saucer assembly. The trunnion tube is clamped between and frictionally engages the upper and lower trunnion saddles. The bunk beam pivots about the horizontal axis of the trunnion tube in the vertical plane. The trunnion tube always remains perpendicular to the longitudinal axis of the trailer/log load.

11 Claims, 6 Drawing Sheets

ARTICULATED BUNK FOR LOGGING TRUCKS

FIELD OF INVENTION

The present invention relates to load carrying bunks and more particularly to log bunks for use with logging trucks.

BACKGROUND TO THE INVENTION

Elongated loads, such as logs, may be transported by means of a truck-trailer unit where the load is contained by two bunks. Each bunk is formed of a generally horizontal bunk beam and vertical bunk stakes mounted at each end of the bunk beam. One bunk is mounted towards the rear of the trailer while another bunk is mounted on the truck.

The bunk mounted on the truck is typically rigidly attached to a hub and saucer or fifth wheel assembly to allow the bunk to rotate with the trailer when the truck-trailer unit goes around curves and corners. However, when a truck-trailer unit carrying a load of logs passes over the crest of a hill or crosses the bottom of a valley, significant stress is placed on the forward bunk if the bunk is rigidly attached to the truck. This stress is a result of the longitudinal axis of the load and trailer being inclined relative to the longitudinal axis of the truck in the vertical plane. In such situations, the saucer may partially disengage from the hub or the front wheels of the truck may actually lift off the road surface, creating significant safety hazards. In addition, the stress causes components of the bunk assembly to wear out prematurely.

The prior art demonstrates previous attempts to solve this difficulty.

U.S. Pat. No. 3,401,955 issued on Sep. 17, 1967 to Alton discloses a logging vehicle with an articulated log bunk. The log bunk is mounted to the logging vehicle by trunnion assemblies which allow pivoting "about an axis extending transversely of the truck . . . whereby the bunk may accommodate displacement of the load from a substantially horizontal position to an inclined position relative to the truck."

U.S. Pat. No. 3,472,527 issued on May 29, 1967 to Keinonen discloses means for mounting a log bunk on a truck. These mounting means includes means which enable the bunk to pivot about a "generally horizontal axis that extends transversely of the truck frame."

However, the mechanisms in Keinonen and Alton have one substantial drawback: the hub-and-saucer assembly, or the means by which the trailer attachment pivots around a vertical axis allowing the truck-trailer unit to negotiate corners and curves, pivots with the bunk around the generally horizontal axis that extends transversely of the truck. As a result, when the truck-trailer unit is negotiating a curve at the same time it is cresting a hill or crossing the bottom of a valley, the load will still create significant stress in the bunk mounting structure. That stress is a result of the fact that the horizontal axis always extends transversely of the truck, rather than extending transversely of the trailer and the load. When the trailer and truck are angled as when negotiating a curve, the horizontal axis about which the trailer attempts to pivot is not parallel with the horizontal axis about which the bunk mounting means allows it to pivot.

Therefore, there is a need in the industry for a bunk mounting mechanism which incorporates a trailer pivot mechanism around a vertical axis as well as allowing the bunk to shift by pivoting around a generally horizontal axis and allowing both pivoting motions to occur at the same time in a relatively stress-free manner.

SUMMARY OF THE INVENTION

The present invention relates to a log bunk for containing and supporting logs when transported by truck-trailer units. It is an object of the present invention to accommodate movement by the trailer/log load in both the horizontal and vertical planes in a relatively stress free manner.

In one aspect of the invention, the invention is a bunk assembly for a truck and trailer unit carrying an elongated load comprising:
   (a) a generally horizontal bunk beam having a top surface for supporting the load and two generally vertical bunk stakes for containing the load, each bunk stake attached to and extending upwardly from each end of the bunk beam;
   (b) horizontal pivot means associated with the bunk beam for allowing the bunk beam and the bunk stakes to pivot about a generally horizontal axis which is always perpendicular to the longitudinal axis of the trailer unit and the load;
   (c) vertical pivot means associated with the truck and the horizontal pivot means for allowing the bunk beam, the trailer and the load to pivot about a vertical axis.

In the preferred embodiment of the invention, the horizontal pivot means is disposed between the vertical pivot means and the bunk beam whereby the horizontal pivot means pivots together with the bunk beam, the trailer and the load about the vertical axis. The horizontal pivot means comprises an upper trunnion saddle fixed to the bunk beam, a generally horizontal cylindrical trunnion fixed to the vertical pivot means, and a lower semi-circular trunnion saddle, whereby the upper and lower trunnion saddles attach together to cylindrically encase the trunnion, thereby securing the bunk beam to the trunnion while allowing the bunk beam to pivot about the trunnion.

The present invention may further comprise stabilizing means for supporting the bunk beam along the full range of its motion as it pivots around the vertical axis, such stabilizing means comprising a pair of rub shoes attached to the bunk beam, located one each on either side of the upper trunnion saddle, and a turntable fixed to the truck bolster whereby the rub shoes rest on the turntable and slide along the turntable as the bunk beam pivots about the vertical axis. The rub shoes are preferably faced with nylon as a friction reducing material.

The present invention may further comprise bunk/load levelling means attached to the bunk beam for ensuring that the bunk beam pivots in unison with the pivoting of the load above the horizontal access. The bunk/load levelling means may comprise a load support member extending horizontally from the bunk beam creating a support plane flush with the top surface of the bunk beam whereby the support plane is perpendicular to a generally vertical plane connecting the bunk stakes.

In another aspect of the invention, the invention is a bunk assembly for a truck-trailer unit carrying an elongated load comprising:
   (a) a generally horizontal bunk beam forming a trunnion recess;
   (b) an upper semi-cylindrical trunnion saddle attached to the bunk beam within the trunnion recess;
   (c) a lower semi-cylindrical trunnion saddle which mates with the upper trunnion saddle to form a cylindrical, tubular trunnion clamp having an interior surface; and (d) a trunnion tube attached to the truck chasis or trailer chassis which frictionally engages the interior surface of the trunnion clamp.

BRIEF DESCRIPTION OF THE DRAWINGS

Embodiments of the invention will now be described with reference to the accompanying drawings in which.

BEST MODE OF CARRYING OUT INVENTION

Figure 1:
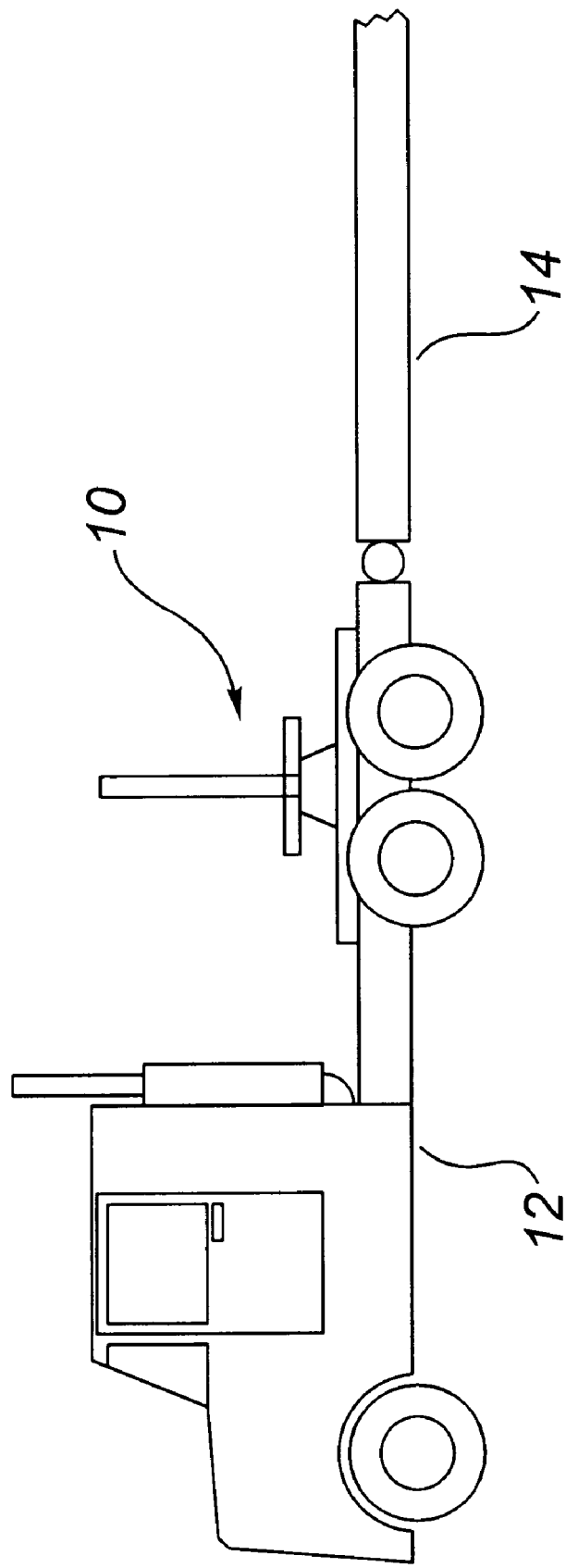
FIG. 1 is a pictorial view showing the preferred embodiment of the present invention mounted on a truck-trailer unit.

Referring to FIG. 1, the bunk assembly of the present invention, generally represented by reference numeral (10), is shown mounted on a truck-trailer unit, which includes truck (12) and trailer (14).

The elongated load, specifically logs, is supported and contained by the bunk assembly (10) at the front end and another bunk assembly (not shown) towards the rear of the trailer (14). The preferred embodiment of the present invention is directed at the front bunk assembly (10) which is mounted to the truck (12).

Figure 2:
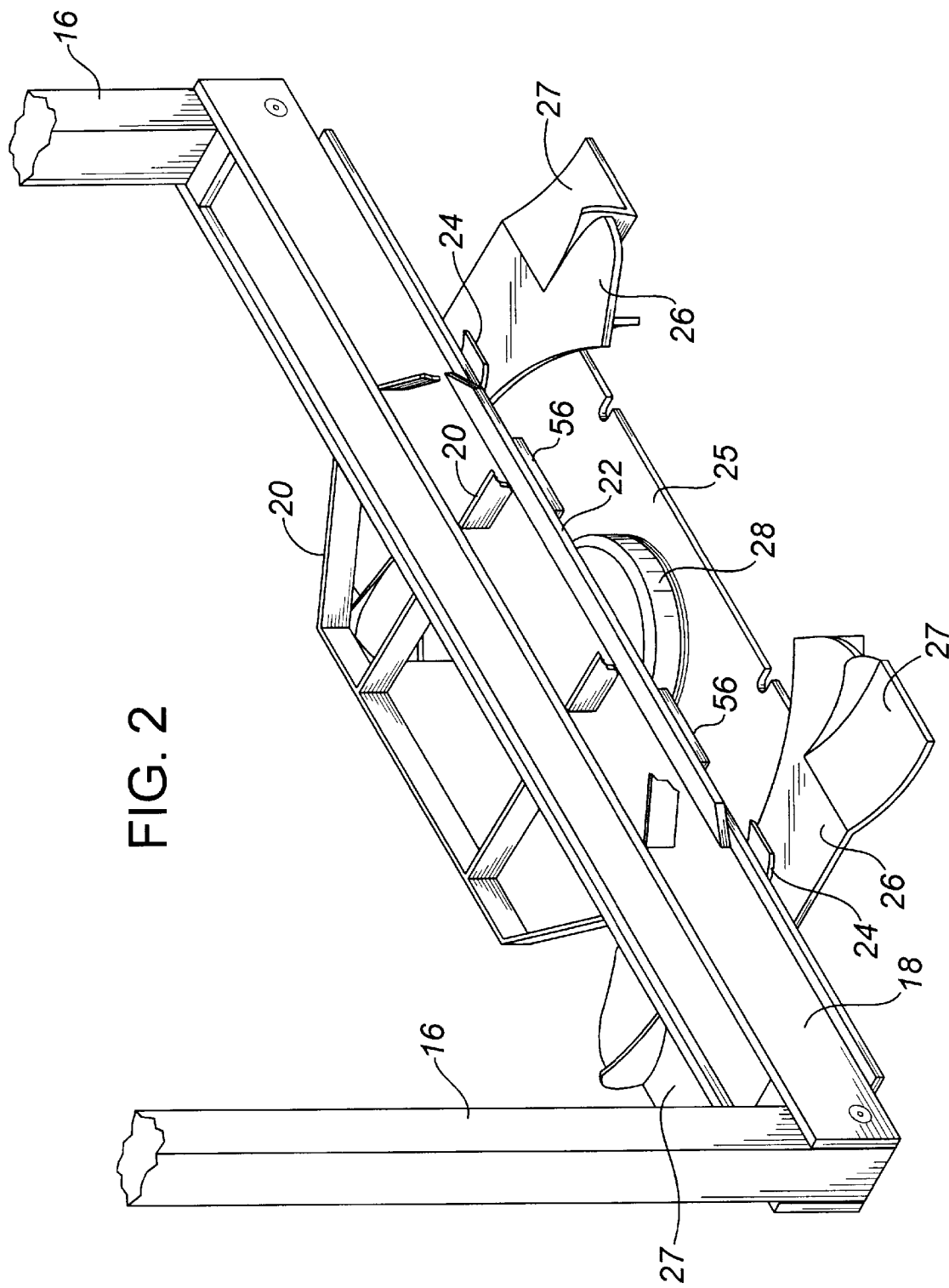
FIG. 2 is an isometric view of the preferred embodiment, looking from a point above and behind.

As shown in FIG. 2, the preferred embodiment of the bunk assembly (10) comprises, in part, bunk stakes (16), a bunk beam (18), bunk/load levellers (20), trunnion saddle bolting flanges (22), rub shoes (24), truck bolster (25), turntable (26), trailer rides (27) and a hub-and-saucer assembly (25).

Figure 3:
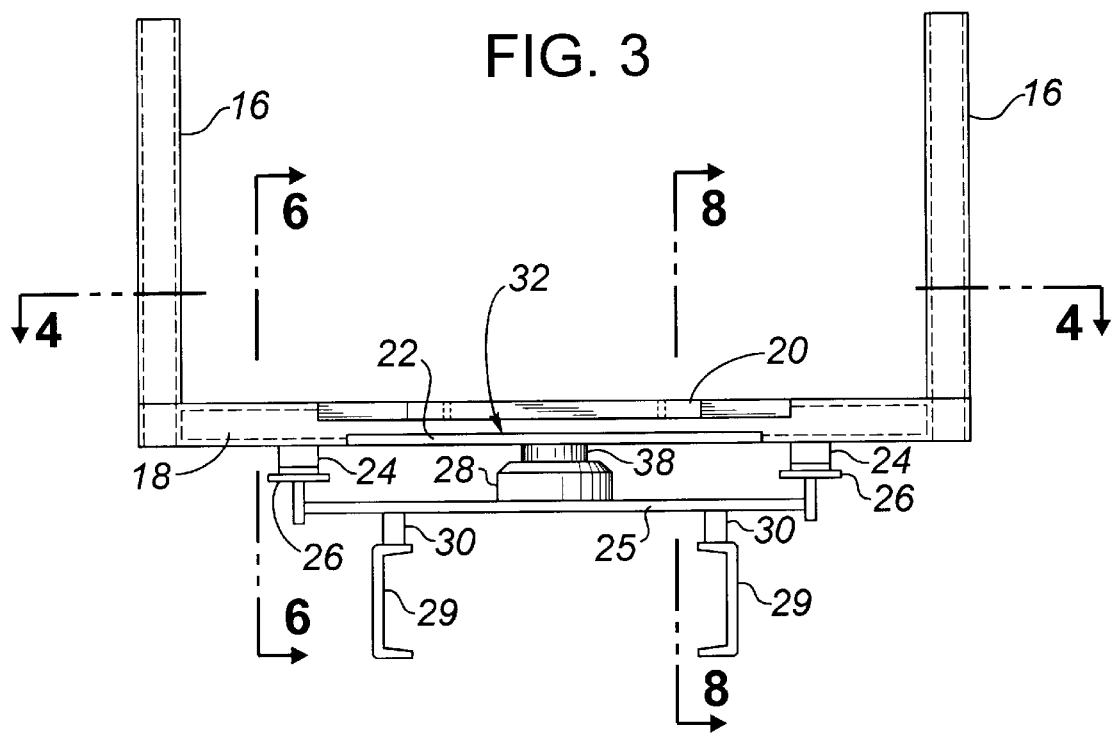
FIG. 3 is an elevational view of the preferred embodiment, looking along the longitudinal axis of the truck-trailer unit.

Referring to FIG. 2 and 3, the truck bolster (25) is a welded assembly of steel plates mounted by bolting to the longitudinal channel members (29) of the chassis of the truck (12). Alternatively, the bolster may rest on load cells (30) which are attached to the channel members (29). The load cells (30) are well-known in the art. The hub-and-saucer assembly (28) is attached to and is supported by the truck bolster (25).

The bunk stakes (16) are rolled, square hollow steel sections mounted to the bunk beam (18) by means of pivot pins (not shown), about which the bunk stakes (16) may pivot laterally relative to the bunk beam (18). Alternatively, the bunk stakes (16) may be rigidly fixed to the bunk beam (18) as by welding. The bunk beam (18) of the preferred embodiment is a welded assembly of steel plates forming a member of hollow rectangular cross-section, with a partially-open bottom face creating a recess (32) into which upper trunnion saddles (not shown), described further below, are mounted. Trunnion saddle bolting flanges (22) are welded to bottom edges of bunk beam side plates (36). Bunk/load levellers (20) are assemblies of steel bars welded to each other and to upper edges of faces of bunk beam side plates (36) flush with top surface of bunk beam (18), such that the weight of the carried load (not shown) resting on the bunk beam (18) and the bunk/load levellers (20) tends to maintain longitudinal axis of the load perpendicular to the vertical plane of the bunk stakes (16).

Figure 4:
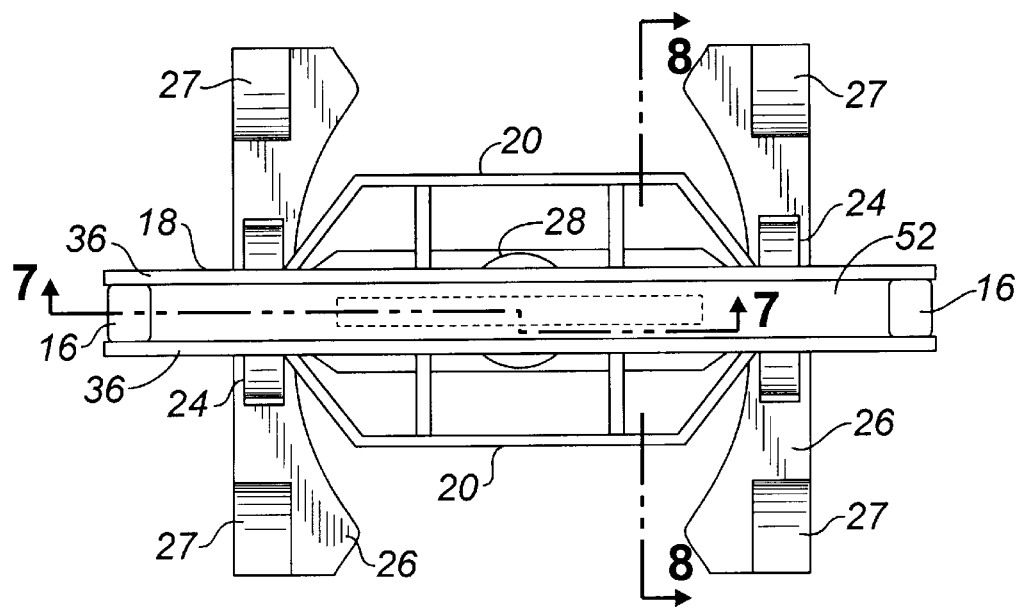
FIG. 4 is a plan view of the preferred embodiment.
Figure 5:
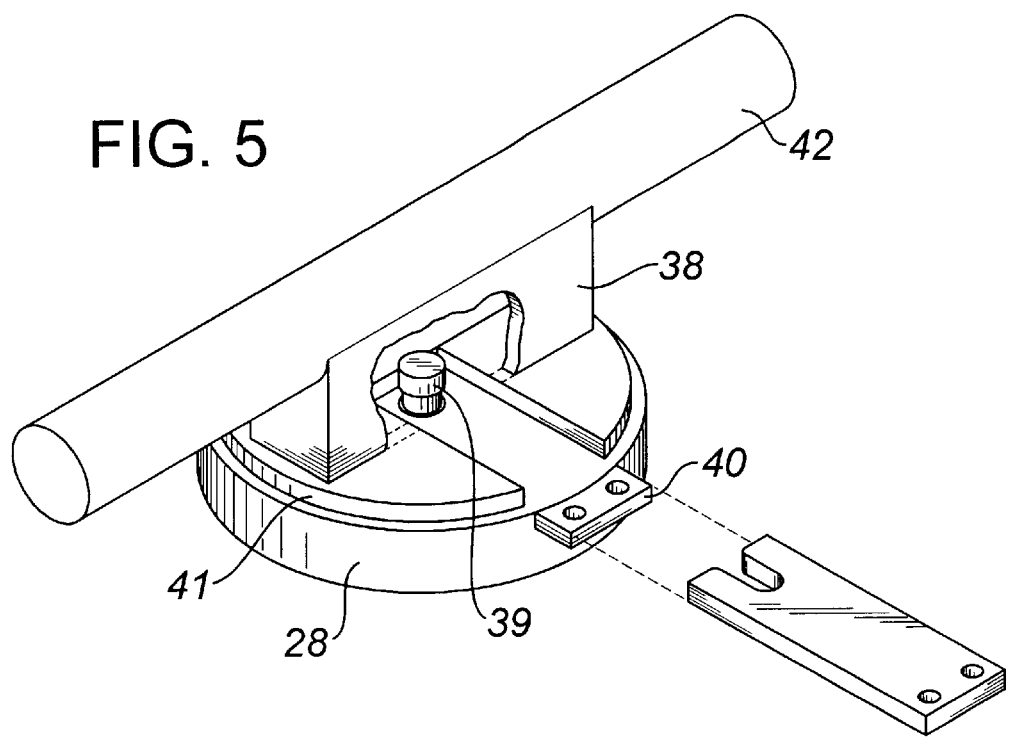
FIG. 5 is an isometric detail of the trunnion, pedestal and hub-and-saucer assembly of the preferred embodiment.
Figure 6:
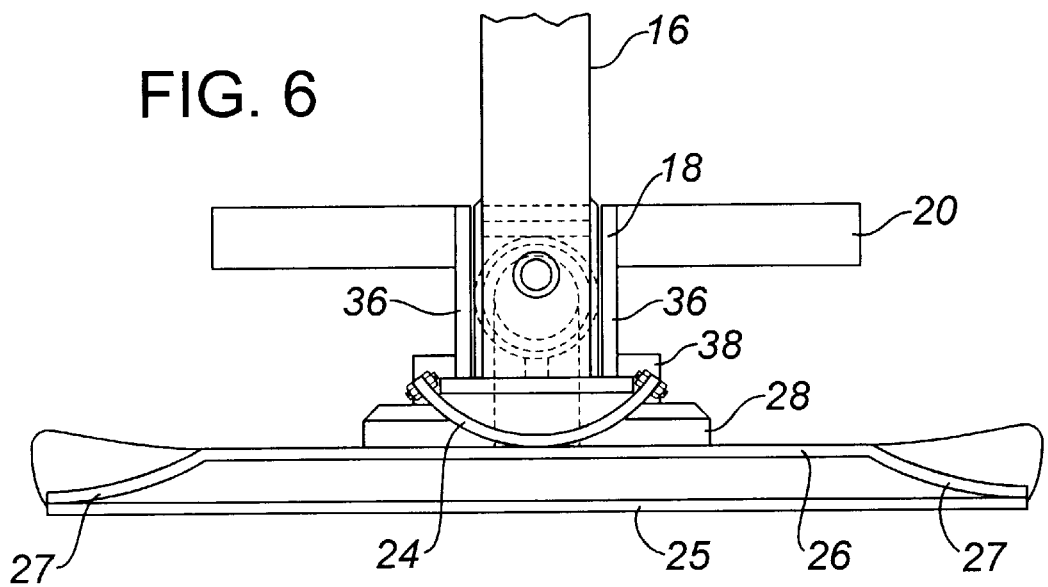
FIG. 6 is a sectional view detailing the pivotal rub shoes of the preferred embodiment.
Figure 7:
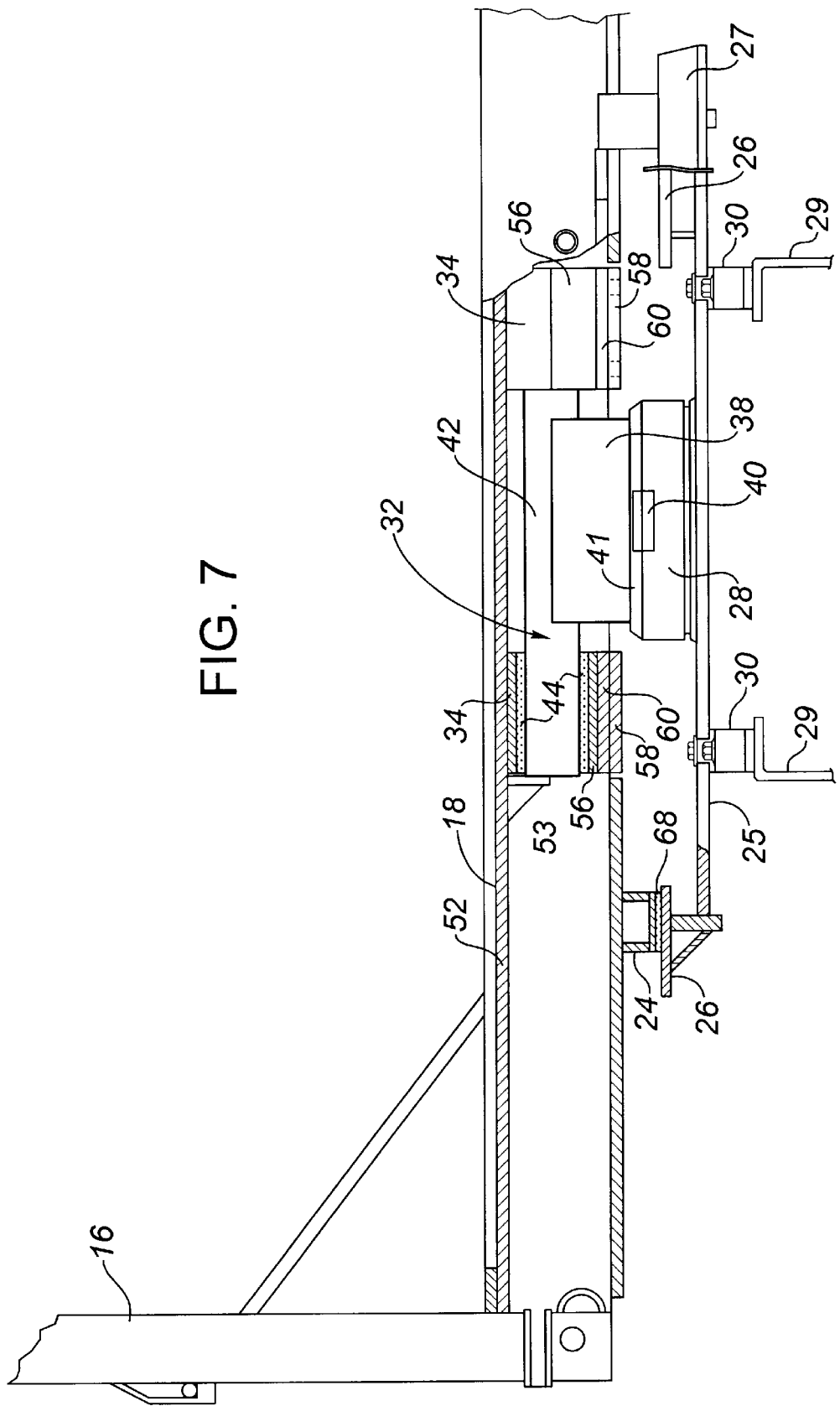
FIG. 7 is an elevational detail and cross-section along line 7—7 of the trunnion assembly of the preferred embodiment.

Referring to FIG. 4 and FIG. 5, the bunk assembly (10) may rotate about a vertical axis by means of the hub-and-saucer assembly (28). The bunk beam is further supported by the rub shoes (24) which slide along the turntable (26). The hub-and-saucer assembly (28) is well-known in the art and may be of proprietary manufacture. The hub-and-saucer assembly (28) is mounted to the truck bolster (25) by means of a bunk bolt (39) and a bunk bolt keeper plate (40), such that the hub-and-saucer assembly (28) and components connected thereto may swivel relative to the truck (12) around vertical axis of the bunk bolt (39). Welded to the top of the saucer is a pedestal mounting plate (41) to which the pedestal (38), an assembly of steel plates welded to each other, is welded. Welded to the top of the pedestal (38) is the trunnion (42), which is preferably a cylindrical steel tube. Cylindrical trunnion bushings (44), shown in FIG. 7, are fitted over the ends of the trunnion (42). These bushings are preferably made of friction reducing material such as nylon.

Figure 8:
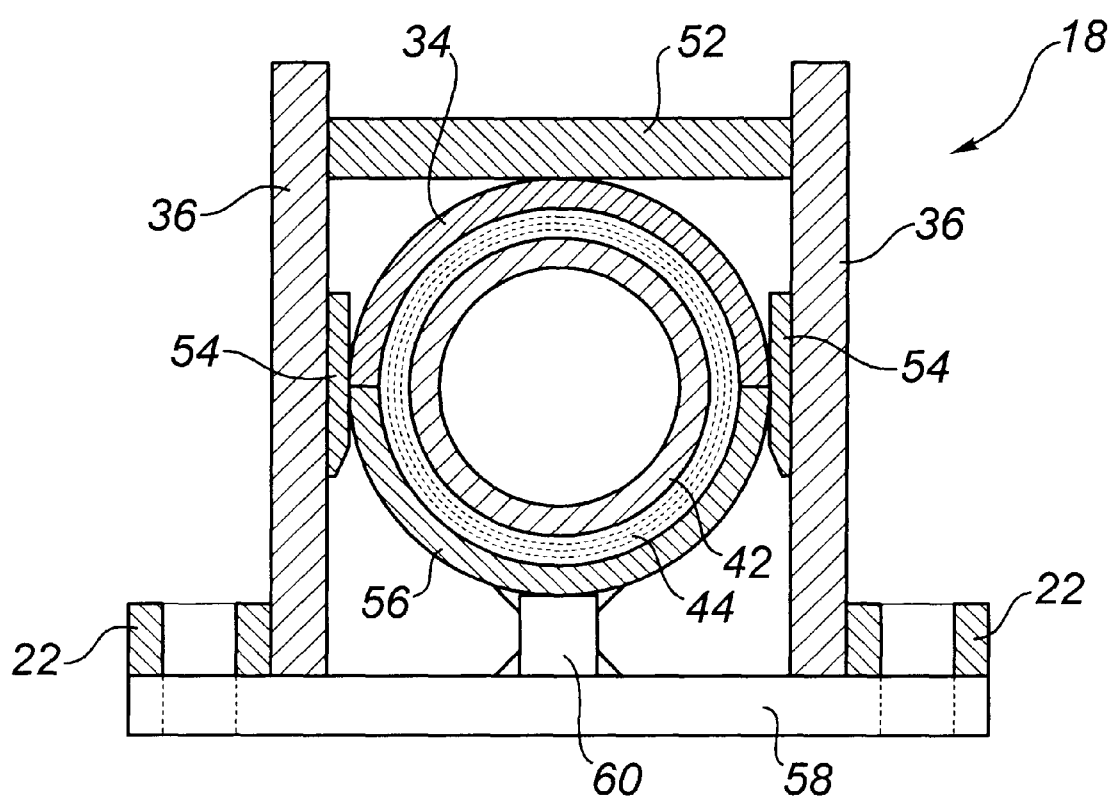
FIG. 8 is a sectional view through line 8—8 of FIG. 3.

Referring to FIG. 7 and FIG. 8, the upper trunnion saddles (34) are inverted semi-cylindrical steel troughs which fit over the trunnion (42) and trunnion bushings (44). As an alternative to the cylindrical trunnion bushings (44), the upper trunnion saddles (34) may be lined with semi-cylindrical bushings (not shown) which may be attached to the saddles (34) by means of countersunk brass screws. The upper trunnion saddles (34) are mounted within the recess (32) in the bunk beam (18) and connected by welding to lower face of bunk beam upper plate (52) and to interior faces of bunk beam side plates (36). Trunnion stops (53) are welded to the upper and side plates (52, 36) to prevent lateral movement of the trunnion within the bunk beam (18). As shown in FIG. 8, welding of the upper trunnion saddles (34) to the inside faces of bunk beam side plates (36) is facilitated by steel shims (54) first welded to bunk beam side plates (36). The steel shims (54) are preferably bevelled to assist in guiding the lower trunnion saddles (56) into place during assembly. The bunk beam (18), with upper trunnion saddles (34) mounted therein, may be positioned over trunnion (42), such that the upper trunnion saddles (34) bear on outboard ends of trunnion (42), with the trunnion bushings (44) mating with the cylindrical surface of the upper trunnion saddle (34). In the preferred embodiment, there are two upper trunnion saddles (34), one on each side of the pedestal (38).

Lower trunnion saddles (56) are semi-cylindrical steel troughs which may alternatively be lined with semi-cylindrical bushings in the same fashion as the upper trunnion saddles (34). Steel base plates (58) drilled with bolt holes are connected by welding to the lower saddles (56). As shown in FIG. 8, welding of the lower trunnion saddles (56) to the base plates (58) is facilitated by steel plinths (60) first welded to base plates (58). With the bunk beam (18) and upper trunnion saddles (34) positioned over the trunnion (42) as previously described, the base plates (58) may be bolted to the trunnion saddle bolting flanges (22) on the bunk beam (18), such that the lower trunnion saddle (56) mates with cylindrical surface of the trunnion bushings (44). With the trunnion (42) thus clamped between the upper trunnion saddles (34) and the lower trunnion saddles (56), the bunk beam (18) and any components connected thereto may pivot fore and aft about a horizontal axis defined by the trunnion (42). Because the trunnion (42) and the upper and lower trunnion saddles (34, 56) rotate about the bunk bolt (39), the axis of horizontal pivoting remains at all times perpendicular to the longitudinal axis of the load and trailer (14).

In the preferred embodiment, the upper and lower trunnion saddles (34, 56) have an inner radial dimension which is slightly smaller than the outer radial dimension of the trunnion bushings (44). Thus, when the trunnion (42) and trunnion bushings (44) are clamped between the upper and lower trunnion saddles (34, 56), the bunk beam (18) and bunk stakes (16) are maintained in an upright position by static friction.

Rub shoes (24) are curved steel plates welded to steel mounting plates, which in turn are welded to underside of bunk beam (18). Bolted to rub shoes (24) are rub shoe liners (68) of friction-resisting material such as nylon. Configuration and dimensions of rub shoes (24) are such as to permit rub shoe liners (68) to remain in load-bearing contact with the upper surface of the turntable (26) throughout range of swivelling of the bunk beam (18) around the vertical axis of the bunk bolt (39). The range of fore-and-aft pivoting of the bunk beam (18) around the trunnion (42) is accommodated by the curved configuration of the rub shoes (24) which permits a rocking motion as the bunk beam (18) pivots about the trunnion (42).

As may readily be seen from the foregoing, the present invention allows the bunk beam (18) and the bunk stakes (16) to rock to-and-fro, or pivot around the generally horizontal axis of the trunnion (42) without undue stress as the log load and trailer (14) moves up and down in the vertical plane. This motion is facilitated by the friction-resistant trunnion bushings (44), interfacing the trunnion (42) and the upper and lower trunnion saddles (34) (56). As well, the bunk/load levellers (20) ensure that the bunk beam (18) and bunk stakes (16) move in unison with the load.

This stress-free motion is possible along the entire range of pivotal motion of the trailer around the vertical axis. The bunk beam (18) is stabilized throughout the range of such motion by the rub shoes (24) which ride on the turntable (26), supported by the truck bolster (25).

The embodiments of the invention in which an exclusive property or privilege is claimed are defined as follows:

1. A bunk assembly for a truck and trailer unit carrying an elongated load comprising:

(a) a bunk beam having a top surface for at least partially supporting the load and two generally vertical bunk stakes for containing the load, each bunk stake attached to and extending upwardly from each end of the bunk beam;

(b) a first pivot associated with the bunk beam for allowing the bunk beam and the bunk stakes to pivot as a unit about a generally horizontal axis which is always perpendicular to the longitudinal axis of the trailer unit and the load; and (c) a second pivot associated with the truck and the first pivot for allowing the bunk beam, the trailer and the load to pivot about a generally vertical axis.

2. The bunk assembly of claim 1 wherein the first pivot is disposed between the second pivot and the bunk beam whereby the first pivot pivots together with the bunk beam, the trailer and the load about the generally vertical axis.

3. The bunk assembly of claim 2 wherein the first pivot comprises:

(a) an upper semi-cylindrical trunnion saddle fixed to the bunk beam;

(b) a generally horizontal cylindrical trunnion fixed to the second pivot; and (c) a lower semi-cylindrical trunnion saddle; whereby the upper and lower trunnion saddles attach together to cylindrically encase the trunnion, securing the bunk beam to the trunnion while allowing the bunk beam to pivot about the trunnion.

4. The bunk assembly of claim 3 wherein the second pivot comprises a hub and saucer assembly wherein the hub is fixedly attaches a truck bolster, the saucer is fixedly attached to the trunnion and the hub is secured to the saucer while allowing rotational movement relative to the saucer.

5. The bunk assembly of claim 3 further comprising a stabilizing assembly for supporting the bunk beam along the fall range of its motion as it pivots around the generally vertical axis.

6. The bunk assembly of claim 5 wherein the stabilizing assembly comprises a pair of rub shoes attached to the bunk beam, located one each on either side of the upper trunnion saddle, and a turntable fixed to a truck bolster, whereby the rub shoes rest on the turntable and slide along the turntable as the bunk beam pivots about the vertical axis.

7. The bunk assembly of claim 6 wherein the rub shoes are curved to permit a rocking motion on the turntable as the bunk beam pivots about the horizontal axis.

8. The bunk assembly of claim 6 or 7 wherein the rub shoes are faced with nylon as a friction reducing material.

9. The bunk assembly of claim 8 wherein the friction reducing material is removable and replaceable.

10. The bunk assembly of one of claims 1, 2, 3, 4, 5, 6 or 7 further comprising a bunk/load leveling assembly attached to the bunk beam for ensuring that the bunk beam pivots in unison with the pivoting of the load about the generally horizontal axis.

11. The bunk assembly of claim 10 wherein the bunk/load leveling assembly comprises a load support member extending horizontally from and rigidly attached to the bunk beam creating a support plane flush with the top surface of the bunk beam whereby the support plane is perpendicular to the generally vertical plane connecting the bunk stakes.

* * * * *